UNITED STATES PATENT OFFICE.

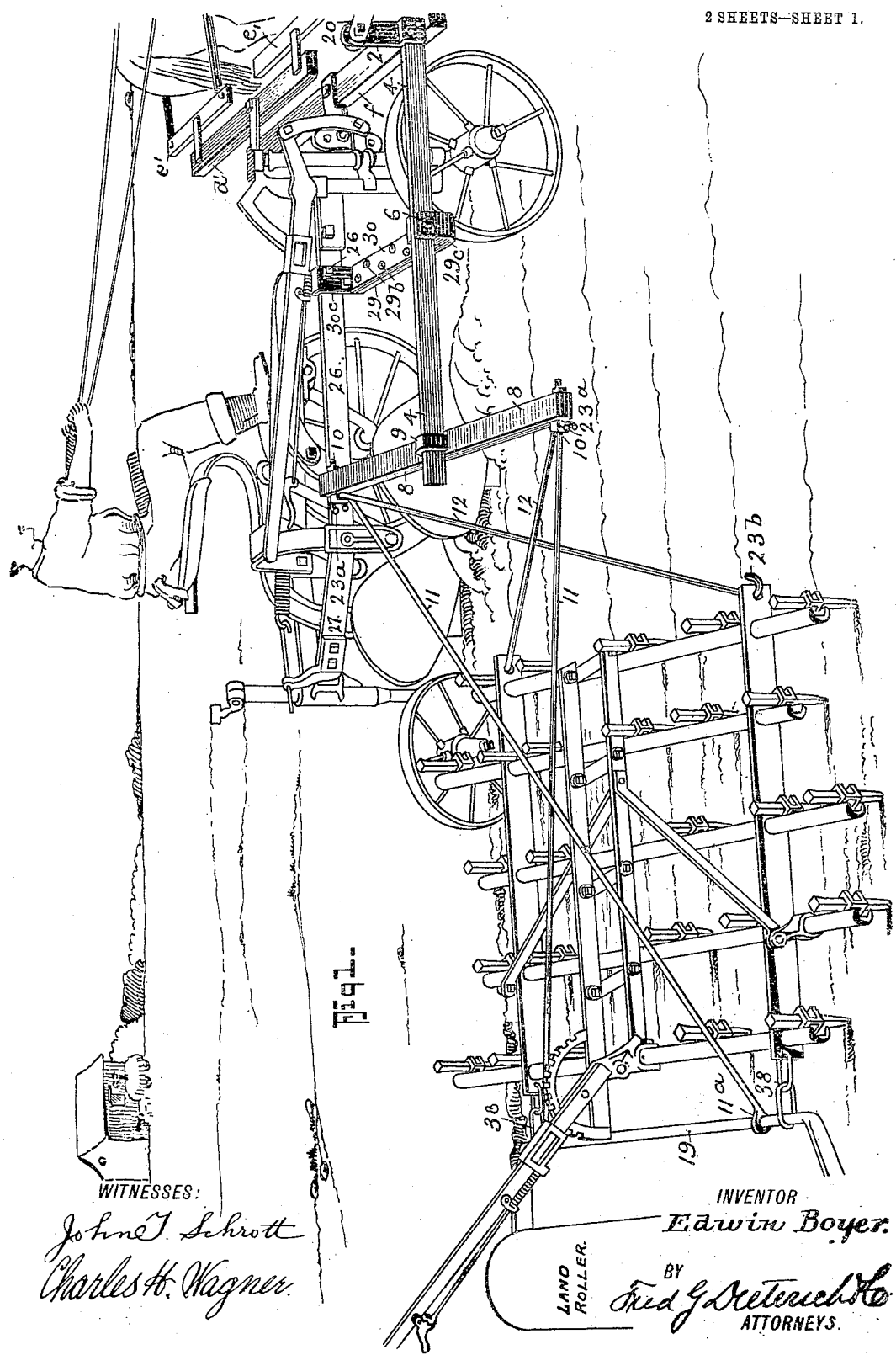

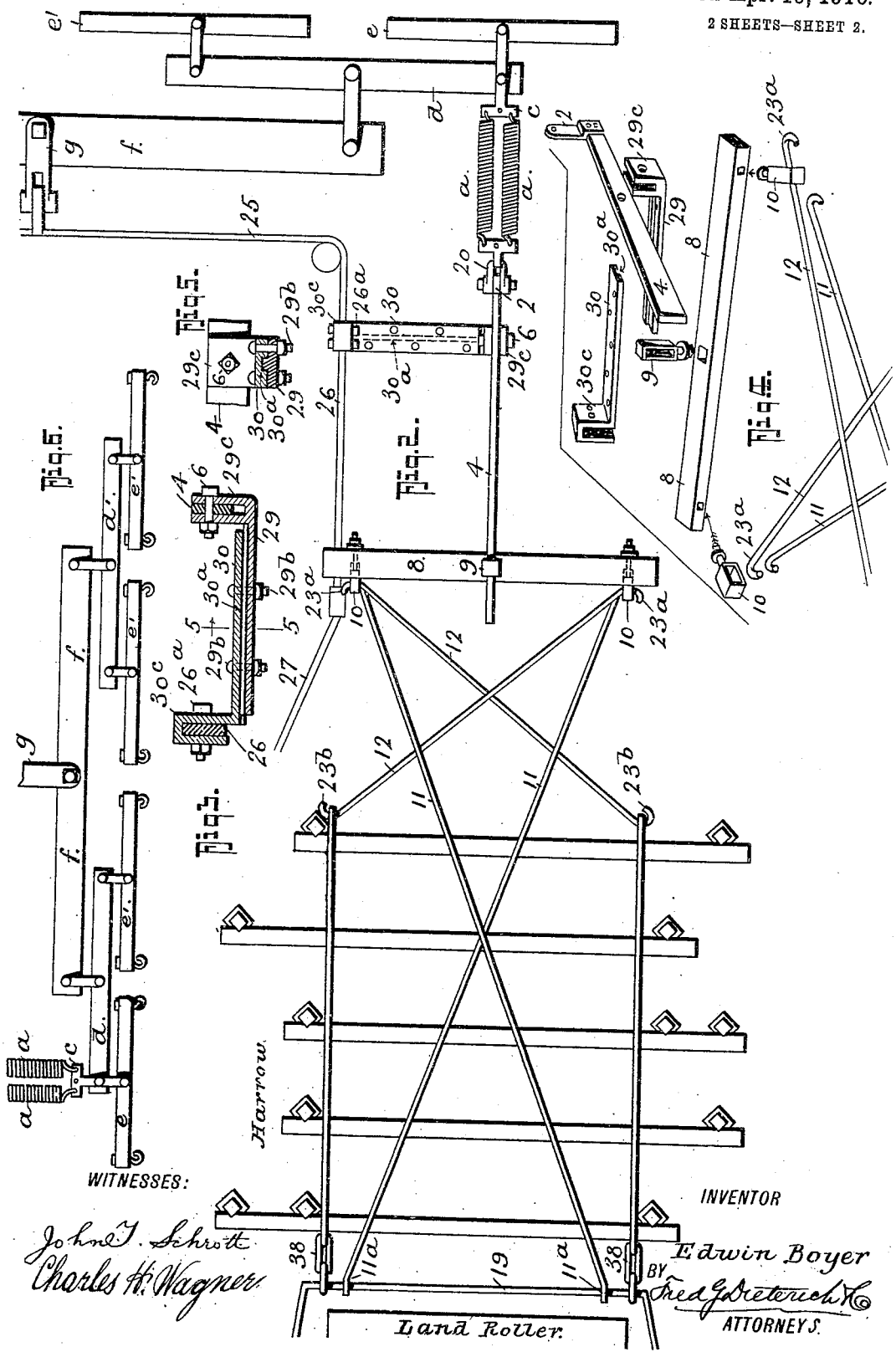

EDWIN BOYER, OF GRAINFIELD, KANSAS.

ATTACHMENT FOR SULKY-PLOWS.

955,496.  Specification of Letters Patent.  Patented Apr. 19, 1910.

Application filed August 4, 1909. Serial No. 511,128.

*To all whom it may concern:*

Be it known that I, EDWIN BOYER, residing at Grainfield, in the county of Gove and State of Kansas, have invented a certain new and Improved Attachment for Sulky-Plows, of which the following is a specification.

This invention has for its object to provide a new and improved means for connecting up with plows of the sulky type, both right or left hand plows, walking or riding, disk or flat bottom plows, a drag harrow, grain drill or seeder, land rollers or a combination of such mechanisms to the mold board side of the plow, and the said means especially is designed to provide for detachably and flexibly connecting one or more of the aforesaid elements to the plow, to permit of independent movement thereof, and in such manner that the soil, immediately after it is turned, is harrowed or planted.

My invention consists, generally, in an improved arrangement of coupling devices adapted for lateral adjustment with respect to the plow so that a harrow, covering or land roller, or other attachment coupled to the plow of a size suitable for working the furrow the full width thereof can be readily coupled to the plow, and in its more specific nature, my invention consists in certain details of construction and novel arrangement of parts, all of which will be hereinafter fully described, specifically pointed out in the appended claims and illustrated in the accompanying drawings, in which:

Figure 1, is a perspective view of a sulky plow, showing my attachments applied thereto, for coupling a harrow therewith. Fig. 2, is a plan view of the same, parts of the sulky plow frame being omitted. Fig. 3, is a longitudinal-section of the adjustable coupling bracket or arm, hereinafter referred to. Fig. 4, is a detail view of the attachments separated from the plow frame. Fig. 5, is a cross section on the line 5—5 on Fig. 3. Fig. 6, is a detail view of the draft connections.

In the drawings, 25, 26 and 27 indicate portions of the right side of the framing of a simple type of gang plow, which may be of any of the conventional forms of sulky plows, since the plow, *per se*, forms no part of my invention.

29 and 30 designate a pair of lapped bars of suitable thickness and width, that are longitudinally adjustable on each other, the lower bar having a key, fitting in a longitudinal groove 30ª in the bar 30 and both bars have a series of apertures for the clamp bolts 29ᵇ. Bar 30 at one end has a bifurcated angle flange 30ᶜ for seating over the edge of the plow frame member, and the said flange 30ᶜ and the plow frame member are suitably apertured to receive the fastening bolts 26, as shown, it being obvious that by joining the bar 30 to the plow frame in the manner shown and described, a very rigid connection for the laterally extended arm or bar 30 is provided for. Bar 29, at its outer end, has a bifurcated flange 29ᶜ similar to flange 30ᶜ for receiving the supplemental draft bar 4 that is rigidly connected to the outer or bifurcated end of the bar 29 by the bolts 6, as clearly shown. The object in making the bracket arms 29—30 adjustable is that its length may be readily increased or diminished to suit the character of the plow to which the attachments are to be applied so the beam or arm 4 may be set, say from twelve to twenty-four inches or more away from it, as may be desirable.

8 is a bar that is transversely mounted on the rear end of draft bar 4 and this bar, in practice, is of a length to suit the adjustment of the bar 4 with respect to the plow beam and the drag device to be coupled to the plow, or it may be made of two longitudinally adjustable members like members 29 and 30. Bar 8 is also detachably and adjustably mounted on the rear end of draft member 4 by the clip bolt 9.

The bar 8 that is used at the rear end of beam 4 varies in length in accordance with the width of the furrow made by the plow, but in each instance it is just as long as is the width of the ground furrow turned by the plow.

The several members referred to are shown as being made of flat bars but in practice they may be T or channel irons.

At each end bar 8 has an eye bolt 10—10 for receiving the hooked ends 23ª of a pair of primary crossed rods or bars 12—12, the inner hooked ends 23ᵇ of which are arranged to be coupled up with the implement or machine to be worked in harmony with the sulky plow. To provide for coupling up a second " drag " in line with the first " drag " which in the drawing is shown as a harrow, of the conventional form, a supplemental set of crossed rods or bars 11 are provided, the front hook ends of which also couple with the eyes 10 on bar 8 and the rear ends of which have eyes 11ª—11ª for receiving the cross rod 19 of the pull clevis or bail 19 of another attachment or "drag" which may be a roller, a seeder or other cultivating or planting device, and to steady the second set, or one, of the attachments, I provide the first "drag" with link connections 38, as shown.

By reason of the peculiar connection and arrangement of the several parts to and on the plow frame, more or less unevenness or side draft on the plow must be regulated and for such purpose an upright member 2 is rigidly bolted to the front end of beam 4, it in practice, being extended a foot or more and at the top it has a pivotally connected clevis bar 20 to which the rear ends of stout draft springs $a$—$a$ are connected the other ends of which link into another clevis bar $c$ that is pivotally mounted on one end of a double tree $d$ and carries at its outer end a swingle tree $e$ as clearly shown in Fig. 2, by reference to which it will also be seen the double tree $d$ carries another swingle tree $e'$ and is itself joined to the main double tree $f$ that carries a double tree $d'$ and another set of swingle trees $e'$—$e'$ and which is hooked up by the clevis $g$ to the sulky plow, as shown. Extending the upright 20 and connecting the spring and double tree $d$ thereto as shown, gets the springs and connection to the double tree out of the way and above the wheels of the sulky plows.

Having thus described my invention, what I claim and desire to secure by Letters Patent, is:—

1. An attachment for sulky plows, comprising a bracket adapted for being fixedly joined to the plow frame to project laterally therefrom, a draft beam mounted thereon and disposed at right angles thereto, a cross member mounted on the rear end of the beam, and flexible connections comprising members connected to the opposite ends of the said cross member and having their free ends arranged for connecting with a drag member.

2. An attachment for sulky plows, that comprises a bracket adapted for being fixedly joined to the plow frame to project laterally therefrom, said bracket being longitudinally extensible, a draft beam mounted on the said bracket and disposed at right angles thereto, a cross member adjustably mounted on the rear end of the beam and flexible connections comprising members connected to the opposite ends of the said cross member and extended rearwardly therefrom.

3. An attachment for sulky plows, comprising a bracket adapted for being fixedly journaled in the plow frame to project laterally therefrom, said bracket being extensible, a draft beam mounted thereon and disposed at right angles thereto, a cross member adjustably mounted on the rear end of the draft beam, flexible connections comprising members connected to the opposite ends of the said cross member and projected rearwardly therefrom and a supplemental set of flexible connections comprising members connected to the ends of the said cross member and extended rearwardly beyond the other connecting members.

4. An attachment for sulky plows, comprising an expansible bracket adapted for being fixedly joined to the plow frame to project laterally therefrom, a draft beam mounted thereon and disposed at right angles thereto, a bracket that extends vertically from the front end of the said beam, said bracket having a clevis member, draft springs connected to the said clevis member, draft equalizer devices connecting the said springs with the draft device of the plow, a cross member on the rear end of the said draft beam and members connected to the opposite ends of the cross member and extended rearwardly therefrom, said members consisting of a set of cross rods of one length and another set of cross rods of greater length.

EDWIN BOYER.

Witnesses:
JESSE E. SMITH,
HENRY C. NEW.